US007677628B2

(12) United States Patent
Lowentat et al.

(10) Patent No.: US 7,677,628 B2
(45) Date of Patent: Mar. 16, 2010

(54) UNIT FOR SYNCHRONOUS EXTENSION AND RETRACTION OF TWO WIRE SEGMENTS, AND A MOTOR VEHICLE HAVING SUCH A UNIT

(75) Inventors: Thomas Lowentat, Bochum (DE); Peter Nellen, Dulsburg (DE); Michael Bohler, Munich (DE); Torsten Schmitt, Riem (DE)

(73) Assignee: Dura Automotive Systems, GmbH, Dusseldorf (DE)

( * ) Notice: Subject to any disclaimer, the term of this patent is extended or adjusted under 35 U.S.C. 154(b) by 1043 days.

(21) Appl. No.: 11/260,475

(22) Filed: Oct. 28, 2005

(65) Prior Publication Data

US 2006/0093307 A1 May 4, 2006

(30) Foreign Application Priority Data

Oct. 29, 2004 (DE) .................. 20 2004 016 893 U
Mar. 22, 2005 (DE) ...................... 10 2005 013 742

(51) Int. Cl.
*B62D 33/03* (2006.01)

(52) U.S. Cl. .................................. 296/57.1; 296/146.8

(58) Field of Classification Search ................ 296/37.8, 296/37.12, 57.1, 146.8; 49/386, 379; 385/147; 74/506, 505
See application file for complete search history.

(56) References Cited

U.S. PATENT DOCUMENTS 1,903,056 A * 3/1933 Mattingly .................. 74/89.22
4,840,080 A * 6/1989 Kobayashi et al. ...... 74/501.5 R
5,531,498 A 7/1996 Kowall
5,768,828 A * 6/1998 Wilson ........................ 49/386
5,896,703 A * 4/1999 Wright et al. ................. 49/339
5,937,478 A * 8/1999 Regnier ......................... 16/78
6,553,719 B1 4/2003 Stone et al.
2002/0040945 A1* 4/2002 Stepancich et al. ....... 242/378.1
2004/0189035 A1* 9/2004 Kurachi et al. ........... 296/37.12
2004/0221511 A1* 11/2004 Rogers et al. ................. 49/360
2005/0161973 A1 7/2005 Yokomori

FOREIGN PATENT DOCUMENTS

| | | |
|---|---|---|
| DE | 44 26 395 A1 | 2/1996 |
| DE | 197 41 691 A1 | 9/1997 |
| DE | 197 41 691 A1 | 7/1998 |
| DE | 20 2004 005 438 U1 | 9/2004 |
| FR | 2796 097 | 1/2001 |
| GB | 2 397 337 | 7/2004 |

* cited by examiner

*Primary Examiner*—Jason S Morrow
(74) *Attorney, Agent, or Firm*—Berenato & White, LLC

(57) ABSTRACT

The invention relates to a unit for synchronous extension and retraction of two wire segments that are wound onto a storage spool in such a way that upon a rotary motion of the storage spool in one rotation direction, both wire segments are synchronously unwound, and upon a rotary motion of the storage spool in the other rotation direction they are synchronously rewound, the wire segments being separated from one another and being fastened at their storage-spool ends to the storage spool, the storage spool comprising a catch that is effective in that rotation direction in which the wire segments are unwound from the storage spool, and is releasable via an actuation device. The invention furthermore relates to a motor vehicle using such a unit.

18 Claims, 4 Drawing Sheets

UNIT FOR SYNCHRONOUS EXTENSION AND RETRACTION OF TWO WIRE SEGMENTS, AND A MOTOR VEHICLE HAVING SUCH A UNIT

CROSS-REFERENCE TO RELATED APPLICATIONS AND CLAIM TO PRIORITY

This application is based upon utility model application number 20 2004 016 893.6, filed Oct. 29, 2004 and patent application number 10 2005 013 742.3, filed Mar. 22, 2005, both in the Federal Republic of Germany, the disclosures of which are incorporated herein by reference and to which priority is claimed.

FIELD OF THE INVENTION

The invention relates to a unit for synchronous extension and retraction of two wire segments, the wire segments being wound onto a storage spool in such a way that upon a rotary motion of the storage spool in one rotation direction, both wire segments are synchronously unwound, and upon a rotary motion of the storage spool in another rotation direction they are synchronously rewound, the wire segments being separated from one another and being fastened at their storage-spool ends to the storage spool. The invention further relates to a motor vehicle having a body that comprises a rear access panel which is guided at the bottom in hinges by way of which it is pivotable about a horizontal axis from a substantially vertical closed position into a horizontal open position, there being provided, on both sides of the rear access panel, wire segments whose free ends are attached to the body of the motor vehicle and which extend to a storage spool arranged on the rear access panel, onto which spool the wire segments are wound in such a way that upon a rotary motion of the storage spool in one rotation direction, both wire segments are synchronously unwound, and upon a rotary motion of the storage spool in another rotation direction they are synchronously rewound.

BACKGROUND OF THE INVENTION

Motor vehicles that comprise a rear access panel that is guided at the bottom in hinges, by way of which it can be pivoted out of a substantially vertical closed position into a horizontal open position, are known in the existing art. In the open position, the rear access panel surface that is then at the top lies flush with the floor of the rear compartment of the vehicle.

In order to limit the pivoting angle of the rear access panel, wire segments that are attached with their free ends in the upper region of the vehicle's body are provided on both sides of the rear access panel. "Wire segments" are also to be understood here as those segments that constitute, for example, cables or other flexible (and thus windable) strands. The wire segments run through openings in the upper corners of the rear access panel to a storage spool arranged centeredly in the interior of the rear access panel. Upon opening of the rear access panel, the wire segments unwind from the storage spool synchronously and at the same speed, until the open position of the rear access panel is reached. The storage spool locks when that position is reached, with the consequence that the rear access panel cannot be pivoted any farther downward.

In the existing art, the two wire segments are part of a single, continuous length of wire that is wound in coiled fashion around the storage spool in such a way that the two wire segments are synchronously unwound in the context of a rotary motion of the storage spool in one rotation direction, i.e. in the case of opening of the rear access panel, and are synchronously rewound in the context of a rotary motion of the storage spool in the other rotation direction, i.e. in the case of closing of the rear access panel. A spring return system ensures that the two wire segments remain tensioned in every position of the rear access panel, and opening of the rear access panel occurs against the action of the spring return system.

The fact that the wire segments are parts of one continuous length of wire makes installation of the length of wire complex and labor-intensive. In addition, it is necessary for the length of wire to be accurately adjusted on the storage spool so that the extended wire segments are always of the same length. The danger nevertheless always exists that the length of wire will slip on the storage spool, with the consequence that the wire segments to be extended and retracted become unequal in length. Damage to the rear access panel can result therefrom.

U.S. Pat. No. 5,531,498 discloses an actuation device for an upwardly openable rear access panel. The actuation device has gas springs, provided on both sides, which are designed with sufficient strength that upon opening, the rear access panel pivots completely into a pivoted-up final position solely as a result of the gas springs. Also associated with the actuation device is a closing device by means of which the rear access panel can be pivoted back downward into its closed position. The closing device comprises two wire segments whose free ends are fastened on the body of the motor vehicle and extend to a storage spool arranged on the rear access panel. There the wire segments are wound on in such a way that upon a rotary motion of the storage spool in one rotation direction, both wire segments are synchronously unwound, and upon a rotary motion of the storage spool in the other rotation direction they are synchronously rewound. The storage spool is driven by an electric motor that is activated when the rear access panel is to be closed. The storage spool is then rotated in such a way that the wire segments are rewound onto it.

The wire segments are not part of a continuous wire, but rather are separate from one another and are fastened with their storage-spool ends on the storage spool by means of enlarged ends engaging into corresponding recesses. Such storage spools are also known from DE 197 41 691 A1.

SUMMARY OF THE INVENTION

It is the object of the present invention to refine a unit of the kind cited above in such a way that it is better suited for use on rear access panels on motor vehicles. A further object is that of adapting such a unit to the rear access panel of motor vehicles.

The first object is achieved according to the present invention in that the storage spool comprises a catch (or blocking mechanism) that, when engaged, is effective in blocking rotation of the storage spool (20) in the rotation direction in which the wire segments unwind from the storage spool, and is releasable via an actuation device. As a result of this configuration, it is possible to prevent the unwinding of the wire segments and thus, for example, the opening of a rear access panel, or to lock it in an intermediate position and thus limit the opening to the extent respectively necessary. Only when the blocking mechanism is released via the actuation device is further unwinding (if applicable) of the wire segments possible.

The possibility exists in principle of embodying the catch in such a way that both unwinding and rewinding of the wire segments onto the storage spool is blocked when the catch is not released via the actuation device. Specifically when the unit is built into the rear access panel of motor vehicles, however, it is sufficient if the catch is effective in blocking fashion exclusively in that rotation direction in which the wire segments are unwound from the storage spool; in other words, in the rewinding direction the storage spool remains substantially freely rotatable, so that in a context of use on a rear access panel, it is possible to close the rear access panel without releasing the catch. The catch can be embodied as a pawl catch. In this case it is useful if the pawl catch comprises a toothed ring mounted on the storage spool and a detent pawl mounted integrally with the unit.

In a further embodiment of the invention, provision is made for the ends of the wire segments to comprise enlargements that are inserted in positively fitting fashion into matching recesses in the storage spool. In this fashion the wire segments can easily be clipped into the recesses. Additional actions in order to fasten the ends are then not necessary.

In a further embodiment of the invention, provision is made for the storage spool to be spring-loaded in the rewinding rotation direction, so that unwinding of the wire segments from the storage spool takes place against the resistance of the spring. The spring then counteracts excessively rapid pivoting of, for example, a rear access panel. A compact design results when the spring is embodied as a spiral spring arranged in the storage spool.

Provision is also made, according to the invention, for the wire segments to fit into guide channels on the storage spool; it is advantageous if the guide channels are embodied in the manner of a double-threaded screw thread, forming semicircular grooves that are adapted to the diameter of the wire segments. This results in exact guidance of the wire segments on the storage spool, so that mutual interference cannot occur.

The wire segments can be embodied as round or flat wires, the latter also having a rectangular or oval cross section. Also to be understood as "wire segments" for purposes of the invention are those embodiments that constitute tapes, belts, or cables. The wire segments can be made of metal, rubber, and/or plastic.

According to a further feature of the invention, provision is made for the storage spool to be arranged on a rear access panel of a motor vehicle, which panel is pivotable about a horizontal axis from a closed position into an open position and vice versa, the wire segments extending from the storage spool to both sides of the rear access panel and from there to the body, where their ends are fastened in such a way that the wire segments are unwound from the storage spool upon opening of the rear access panel. With the storage spool according to the present invention used in this fashion, it is possible to retain the rear access panel in various positions and thereby to block further opening of the rear access panel. Opening of the rear access panel can thus be limited to the extent that is necessary in each case; this is advantageous in particular when space circumstances do not permit further opening of the rear access panel, for example in a garage or in confined parking situations.

The second part of the object is achieved according to the present invention in that in the context of a motor vehicle that is equipped, in a manner known per se, with a downwardly pivotable rear access panel and with a storage spool arranged thereon, the wire segments wound onto the storage spool are separated from one another and are fastened to the storage spool with their storage-spool ends. Installation of the wire segments is thereby made substantially easier, and there is also no need for adjustment operations in order to ensure that the extending wire segments always have the specified length. In addition, nothing can change subsequently, since the storage-spool ends of the wire segments are fastened to the storage spool, i.e. can no longer slip.

The storage spool can otherwise be embodied in the same fashion as in the case of the above-described unit for synchronous extension and retraction of two wire segments.

DESCRIPTION OF THE DRAWINGS

The invention is illustrated in more detail, with reference to an exemplifying embodiment, in the drawings, in which.

DETAILED DESCRIPTION OF THE PREFERRED EMBODIMENT(S)

Figure 5:
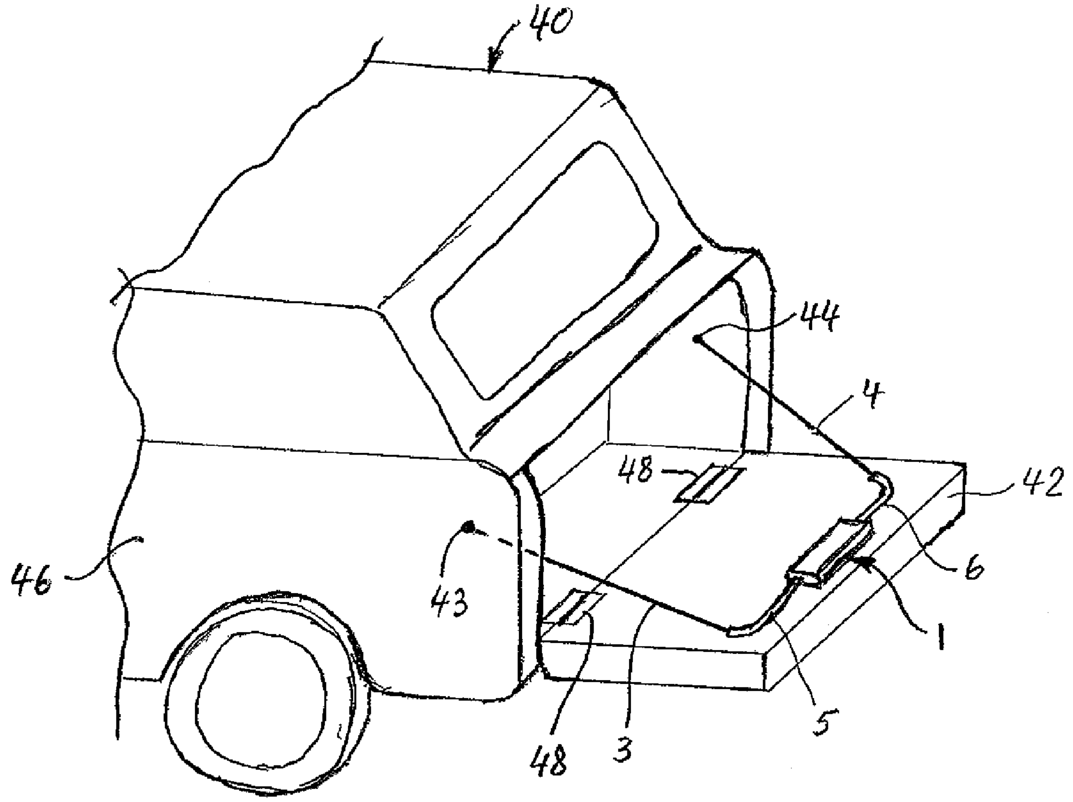
FIG. 5 is a fragmentary perspective view of a rear portion of a vehicle body having a pivoting rear access panel according to the present invention, shown in its open position.
Figure 6:
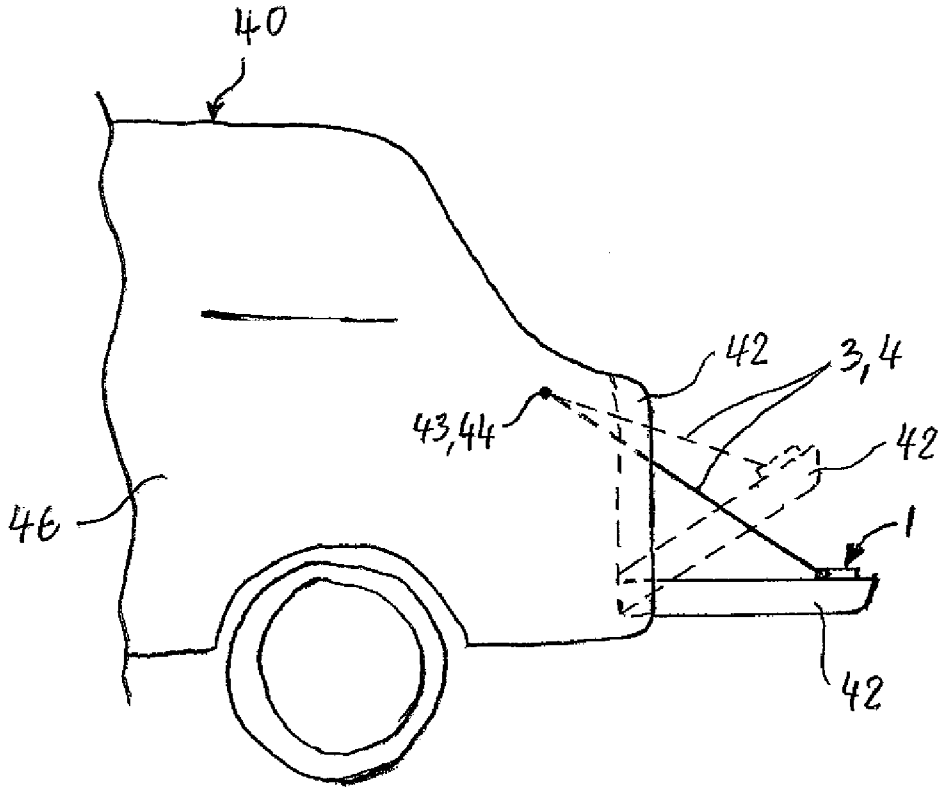
FIG. 6 is a side view of the vehicle body showing the rear access panel in a substantially vertical closed position, a substantially horizontal open position and a partially open position.

A unit 1 for synchronous extension and retraction that is depicted in the Figures comprises a storage device, designated as a whole with the number 2, from which two wire segments 3, 4, which are guided outside the storage device 2 in guide sleeves 5, 6, proceed in opposite directions. At the ends adjacent to the storage device 2, guide sleeves 5, 6 are fastened in retainers 7, 8. In the context of an installation of the unit 1 inside a rear access panel 42 of a vehicle 40 (as illustrated in FIG. 5), the ends of the guide sleeves 5, 6 are guided to upper corners of that panel 42. The wire segments 3, 4 emerge there from the rear access panel 42 and are attached with their free ends 43, 44 to a body 46 of the associated vehicle 40, usefully in the upper corners of the rear access panel opening. The rear access panel 42 of the vehicle 40 is guided on hinges 48 by way of which it is pivotable about a horizontal axis from a substantially vertical closed position into a horizontal open position, as illustrated in FIG. 6.

The storage device 2 has a storage housing 9 that is constituted by two housing parts 10, 11. The one housing part 10 is embodied as a flat plate, while the other housing part 11 has a cup shape having lateral brackets 12, 13 with which cup-shaped housing part 11 is attached to plate-shaped housing part 10. Attachment of the storage device 2, for example, inside the rear access panel 42 is accomplished via the corners of housing part 10. Screw holes (designated 14 by way of example) are provided for this purpose.

Figure 4:
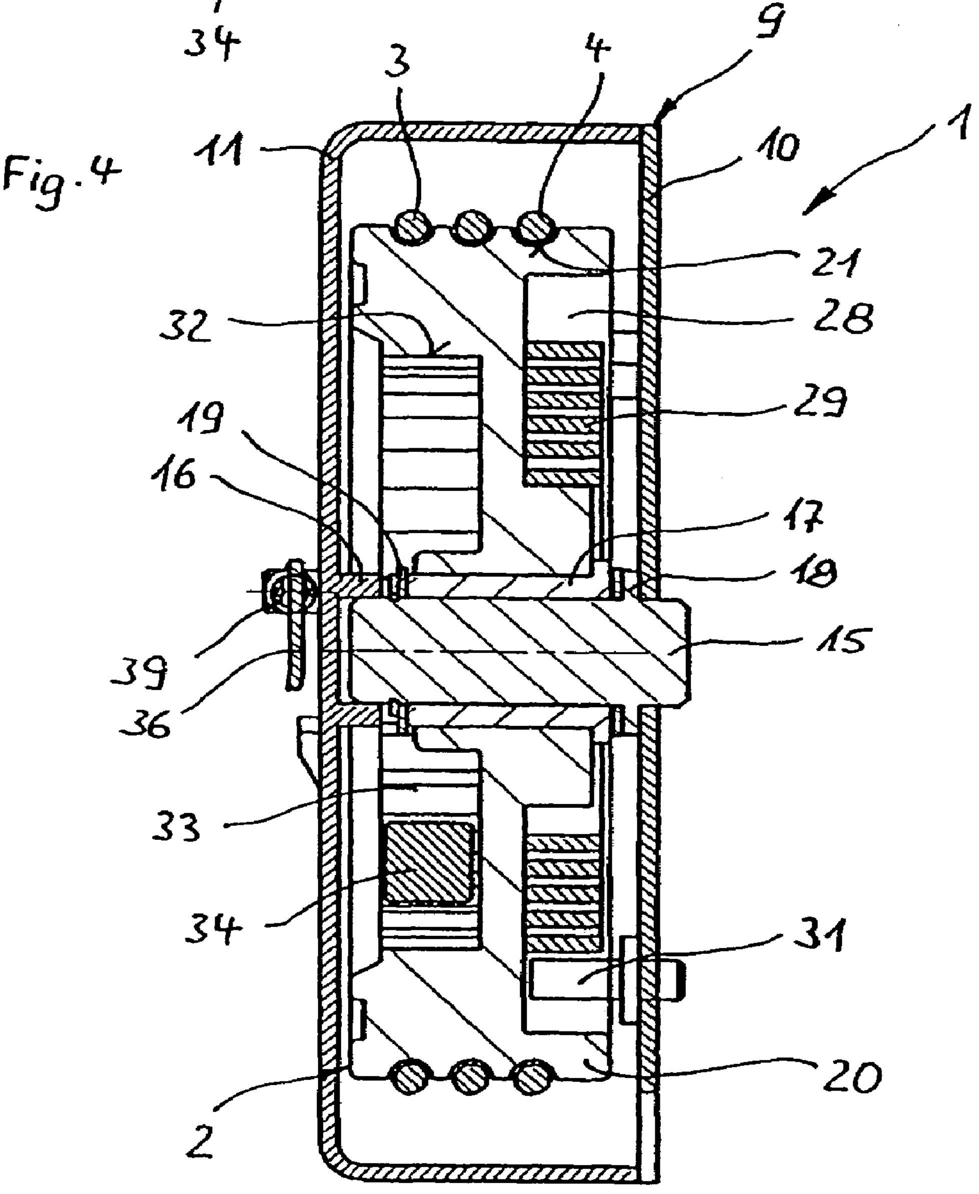
FIG. 4 is a cross section through the unit according to FIGS. 1 and 2, perpendicular to the rotation plane of the storage spool.

Extending inside storage housing 9 is a rotary shaft 15 (FIG. 4) that is held at one end in a guide ring 16 and at the other end in housing part 10. Located on rotary shaft 15 is a bearing bushing 17 that is braced at one end with respect to a collar 18 on rotary shaft 15, and at the other end against a Seeger circlip ring 19. Sitting on bearing bushing 17 is a storage spool 20 into whose casing guide grooves (designated 21 by way of example) are recessed. Guide grooves 21 have the profile of a double-threaded screw thread, i.e. two guide grooves extend in coiled fashion next to one another on the casing of storage spool 20. The two wire segments 3, 4 sit in guide grooves 21.

In order to fasten the ends of wire segments 3, 4 to the storage spool, wire segments 3, 4 comprise nipple-like enlargements 22, 23 (cf. FIG. 2) that fit in positively engaging fashion, diametrically opposite one another, into recesses 24, 25 on the outer rim of storage spool 20 that match enlargements 22, 23. Extending from recesses 24, 25 to the casing of storage spool 20 are open slots 26, 27 through which the ends of the two wire segments 3, 4 can be inserted into recesses 24, 25. The ends are held in lossproof fashion in these recesses 24, 25.

Figure 1:
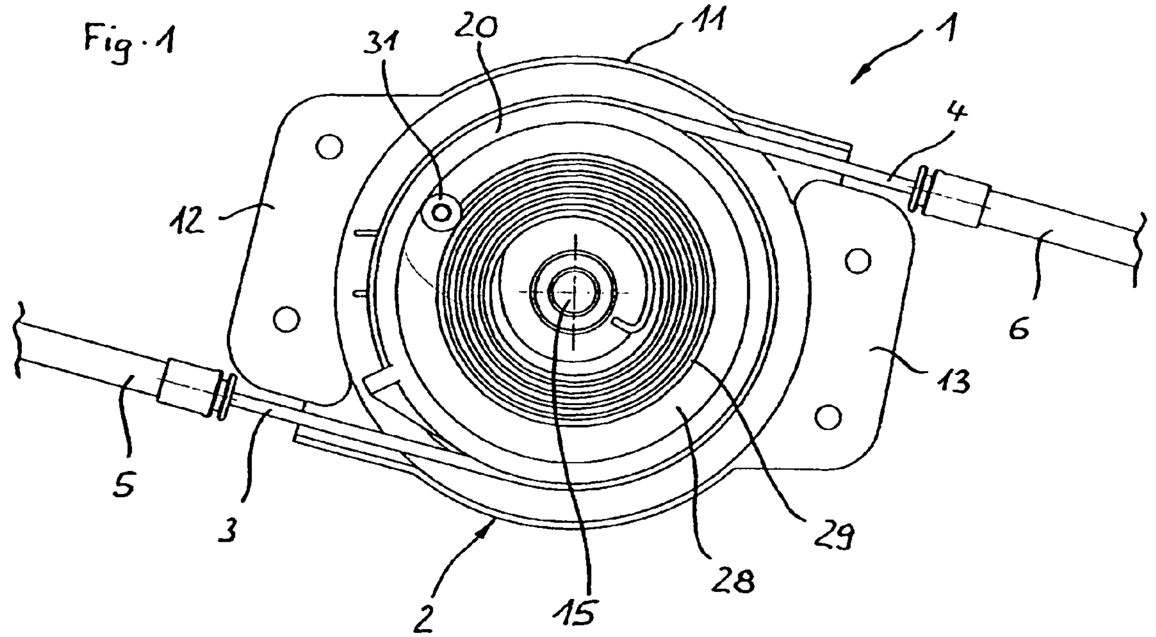
FIG. 1 is a side view of the unit according to the present invention from one side, with the first cover removed.

Storage spool 20 has on the one side an annular recess 28. Sitting in this recess 28 is a spiral spring 29 whose inner end 30 is fastened to storage spool 20 and whose outer end is joined to a stud 31 that is attached to housing part 10. As a result of spiral spring 29, storage spool 20 is spring-loaded in the rewinding direction (counterclockwise in FIG. 1).

Figure 2:
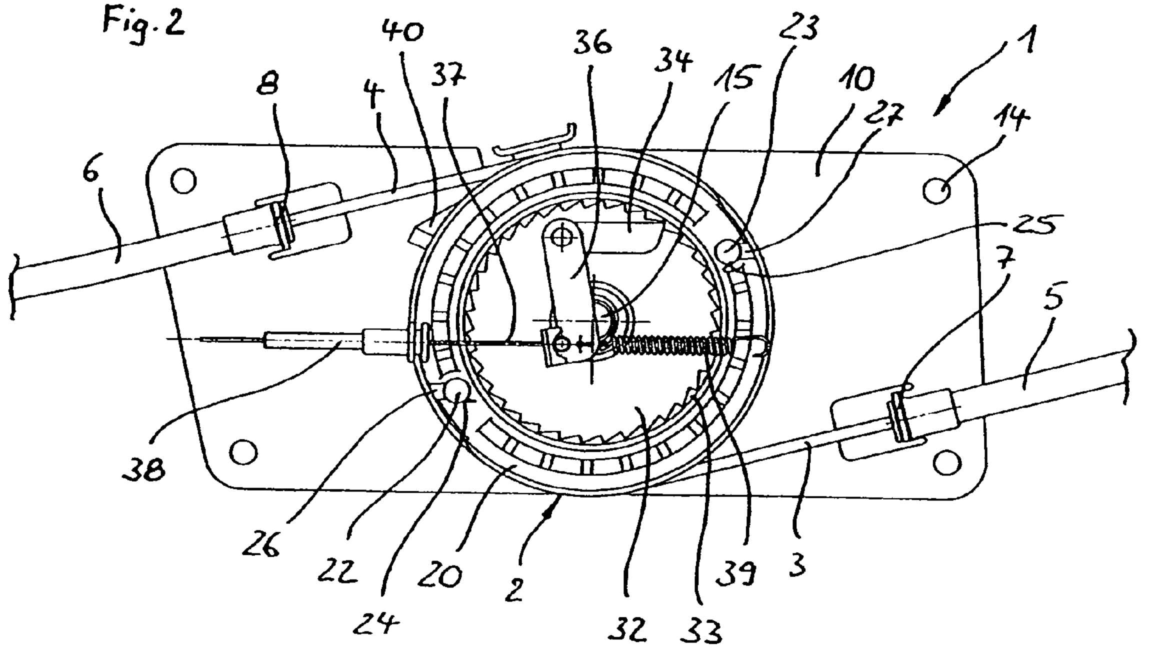
FIG. 2 shows the unit according to FIG. 1 from the other side, with the second cover removed.

On the side opposite recess 28, storage spool 20 likewise comprises an annular recess 32. Recess 32 has on the outside a ratchet tooth set 33 of sawtooth type (cf. especially FIG. 2). Associated with ratchet tooth set 33 is a detent pawl 34 that, as FIG. 2 shows, fits into ratchet tooth set 33 in the blocking position and, in that position, blocks any rotary motion of storage spool 20 in the unwinding direction. Storage spool 20 remains rotatable in the rewinding direction. The ratchet tooth set 33 and the detent pawl 34 together form a blocking mechanism (33, 34) that, when engaged, blocks rotation of the storage spool (20) in the rotation direction in which the wire segments (3, 4) are unwound from the storage spool (20).

Figure 3:
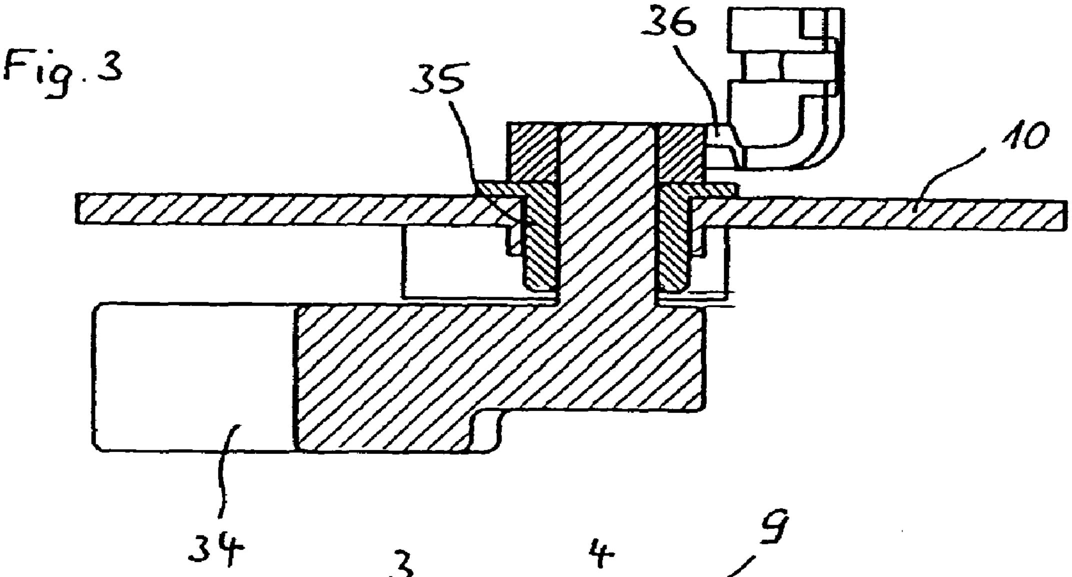
FIG. 3 is a cross-section through the detent pawl of the unit according to FIGS. 1 and 2.

Detent pawl 34 is mounted in a bearing bushing 35 that sits in housing part 11 (cf. FIG. 3). Detent pawl 34 is joined nonrotatably to an actuation lever 36 at whose free end wire 37 of an actuation cable 38 is pivot-mounted on the one side, and a tension-loaded helical spring 39 is pivot-mounted on the other side (cf. FIG. 2). By way of actuation cable 38, actuation lever 36 and thus detent pawl 34 can be pivoted clockwise (FIG. 2), against the action of helical spring 39, out of engagement with ratchet tooth set 33, so that storage spool 20 is then rotatable in both directions. The actuation of actuation cable 38 is accomplished from its end that is not depicted here, with the aid of a handle or the like. When no tensile force is being exerted on wire 37, actuation lever 36 and therefore detent pawl 34 are pivoted by helical spring 39 back into engagement with ratchet tooth set 33.

As a result of the above-described configuration of unit 1, wire segments 3, 4 are unwound from the casing of storage spool 20 when actuation cable 38 is actuated in such a way that detent pawl 34 is moved out of its engagement in ratchet tooth set 33 and tension is exerted on wire segments 3, 4. When unit 1 is installed in a rear access panel, this occurs upon downward pivoting of the rear access panel into the horizontal position. Unwinding takes place, in this context, against the action of spiral spring 29. In the end position, a stop 40 on storage spool 20 ensures that further rotation of storage spool 20 is prevented. The rear access panel can be retained in any intermediate position by releasing the load on actuation cable 38, since detent pawl 34 then comes back into engagement with ratchet tooth set 33.

Upon upward pivoting of rear storage panel, spiral spring 29 ensures that wire segments 3, 4 are synchronously rewound back onto storage spool 20 until the rear access panel has reached its closed position. Because guide grooves 21 sit on the same diameter, the rewinding and unwinding of wire segments 3, 4 takes place not only simultaneously, but also at the same speed.

We claim:

1. A unit (1) for synchronous extension and retraction of two wire segments (3,4) wound onto a storage spool (20) in such a way that upon a rotary motion of the storage spool (20) in one rotation direction, both wire segments (3,4) are synchronously unwound, and upon a rotary motion of the storage spool (20) in the other rotation direction they are synchronously rewound, the wire segments (3,4) being separated from one another and being fastened at their storage-spool ends to the storage spool (20), wherein the storage spool (20) comprises a blocking mechanism (33,34) that, when engaged, blocks rotation of the storage spool (20) in the rotation direction in which the wire segments (3, 4) are unwound from the storage spool (20), and is releasable via an actuation device; and wherein the storage spool (20) is arranged on a rear access panel of a motor vehicle, which panel is pivotable about a horizontal axis from a closed position into an open position and vice versa, the wire segments (3, 4) extending from the storage spool (20) to both sides of the rear access panel and from there to the body, where their ends are fastened in such a way that the wire segments (3, 4) are unwound from the storage spool (20) upon opening of the rear access panel.

2. The unit according to claim 1, wherein the blocking mechanism (33, 34) is effective in blocking rotation of the storage spool (20) exclusively in the rotation direction in which the wire segments (3, 4) are unwound the storage spool (20).

3. The unit according to claim 1, wherein the blocking mechanism is embodied as a pawl catch (33, 34).

4. The unit according to claim 3, wherein the pawl catch comprises a ratchet toothed ring (33) mounted on the storage spool (20) and a detent pawl (34) mounted integrally with the unit.

5. The unit according to claim 1, wherein the ends of the wire segments (3, 4) comprise enlargements (22, 23) that are inserted in positively engaging fashion into matching recesses (24, 25) in the storage spool (20).

6. The unit according to claim 1, wherein the storage spool (20) is spring-loaded in the rewinding rotation direction.

7. The unit according to claim 6, wherein the spring is embodied as a spiral spring (29) arranged in the storage spool (20).

8. The unit according to claim 1, wherein the wire segments (3, 4) fit into guide grooves (21) on the storage spool (20).

9. The unit according to claim 1, wherein the wire segments (3, 4) are embodied as round or flat wires, as tapes, belts, or cables made of metal, rubber, and/or plastic.

10. A motor vehicle comprising:

a body and a rear access panel pivotable on hinges from a substantially vertical closed position into a horizontal open position;

wire segments (3, 4) provided on both sides of the rear access panel so that free ends thereof are attached to the body of the motor vehicle and extend to a storage spool (20) arranged on the rear access panel and are wound on the storage spool in such a way that upon a pivoting motion of the rear access panel in the direction toward the open position both the wire segments (3, 4) are synchronously unwound from the storage spool (20), and upon a pivoting motion of the rear access panel in the closing direction, both wire segments (3, 4) are synchronously rewound onto the storage spool (20);

wherein the wire segments (3, 4) are separated from one another and are fastened to the storage spool (20) with their storage-spool ends, and wherein the storage spool (20) comprises a blocking mechanism (33, 34) that, when engaged, blocks rotation of the storage spool (20) in the rotation direction in which the wire segments (3, 4) are unwound from the storage spool (20), and is releasable via an actuation device (36, 37, 38).

11. The motor vehicle according to claim 10, wherein the ends of the wire segments (3, 4) comprise enlargements (22, 23) that are inserted in positively engaging fashion into matching recesses (24, 25) in the storage spool (20).

12. The motor vehicle according to claim 10, wherein the storage spool (20) is spring-loaded in the rewinding rotation direction.

13. The motor vehicle according to claim 12, wherein the spring is embodied as a spiral spring (29) arranged in the storage spool (20).

14. The motor vehicle according to claim 10, wherein the blocking mechanism (33, 34) is effective in blocking rotation of the storage spool (20) exclusively in the rotation direction in which the wire segments (3, 4) are unwound from the storage spool (20).

15. The motor vehicle according to claim 10, wherein the blocking mechanism is embodied as a pawl catch (33, 34).

16. The motor vehicle according to claim 15, wherein the pawl catch comprises a ratchet toothed ring (33) mounted on the storage spool (20) and a detent pawl (34) mounted integrally with the unit.

17. The motor vehicle according to claim 10, wherein the wire segments (3, 4) fit into guide channels (21) on the storage spool (20).

18. The motor vehicle according to claim 10, wherein the wire segments (3, 4) are embodied as round or flat wires, as tapes, belts, or cables made of metal, rubber, and/or plastic.

* * * * *

UNITED STATES PATENT AND TRADEMARK OFFICE

CERTIFICATE OF CORRECTION

PATENT NO. : 7,677,628 B2
APPLICATION NO. : 11/260475
DATED : March 16, 2010
INVENTOR(S) : Thomas Lowentat et al.

It is certified that error appears in the above-identified patent and that said Letters Patent is hereby corrected as shown below:

Title Page, Item (75) Inventor, please replace inventor Peter NELLEN's city "Dulsburg" with "Duisburg"

Signed and Sealed this

Twenty-ninth Day of June, 2010

David J. Kappos
*Director of the United States Patent and Trademark Office*